_United States Patent_  
Robinson

[15] 3,674,193  
[45] July 4, 1972

[54] STRIP TENSION SENSING DEVICE
[72] Inventor: Raymond E. Robinson, Baden, Pa.
[73] Assignee: Blaw-Knox Foundry & Mill Machinery, Inc., Pittsburgh, Pa.
[22] Filed: April 29, 1971
[21] Appl. No.: 138,609

[52] U.S. Cl. .............................. 226/100, 226/195, 226/199
[51] Int. Cl. ....................................................... B65h 23/00
[58] Field of Search ............... 226/195, 199, 100; 242/75.2, 242/78.1, 78.3

[56] References Cited
UNITED STATES PATENTS
3,433,398  3/1969  Fadden et al. ..................... 226/195 X
3,246,818  4/1966  Davis ................................ 226/195 X Primary Examiner—Allen N. Knowles
Assistant Examiner—Gene A. Church
Attorney—Smith, Harding, Earley & Follmer

[57] ABSTRACT

A device for sensing the tension of a strip of material being fed to or from a rolling mill or the like through a bridle-type roll assembly wherein a load cell is positioned adjacent the supporting chocks for one of the rolls of the bridle roll assembly so that the tension forces on the strip urge the chock against the load cell.

10 Claims, 2 Drawing Figures

INVENTOR
RAYMOND E. ROBINSON

BY
Smith, Harding, Earley & Follmer
ATTORNEYS

STRIP TENSION SENSING DEVICE

BACKGROUND OF THE INVENTION

The invention relates to a device for sensing the tension of a strip of material.

In the operation of rolling mills or the like, it is common practice to subject the strip to tension as it is fed to or from a rolling mill stand. Moreover, since it is important that proper tension be maintained, it is common to provide means for measuring the tension of the strip, such as tensiometer means. Such devices conventionally employ three rolls, namely, a fixed roll on each side of a movable tensiometer roll which is urged toward the moving strip to deflect the same away from its normal path of travel. However, conventional tensiometers are not entirely satisfactory since they involve a relatively high cost of manufacture and maintenance.

SUMMARY OF THE INVENTION

It is the general object of the invention to provide a strip tension sensing device which replaces the conventional tensiometer and involves a much lower cost of manufacture and maintenance.

Briefly stated, the tension sensing device in accordance with the invention involves the provision of a load cell in a bridle-type roll assembly associated with a rolling mill and through which the strip passes under tension as it is fed to or from the rolling mill. The bridle roll assembly includes chock means for rotatably supporting the roll about which the strip passes as it moves therethrough. The load cell is supported adjacent said chock means at a location whereby the tension of the strip moving through the bridle roll assembly urges the chock means to bear against the load cell. The load cell is of the pressure-sensitive type so that in sensing the bearing forces applied by said chock means it, in effect, senses the strip tension.

It will be noted that since bridle roll assemblies are usually provided in association with a rolling mill, the tension sensing device in accordance with the invention does not require the use of additional rolls but simply makes use of apparatus which is already associated with the rolling mill. Accordingly, the cost of manufacture is low. Moreover, the device in accordance with the invention has fewer parts requiring maintenance as compared with conventional tensiometers.

DESCRIPTION OF THE PREFERRED EMBODIMENT

Figure 2:
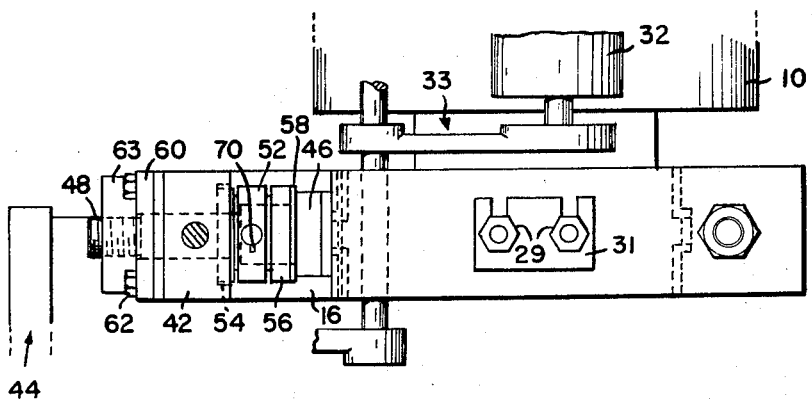
FIG. 2 is a section taken generally on line 2—2 of FIG. 1.
Figure 1:
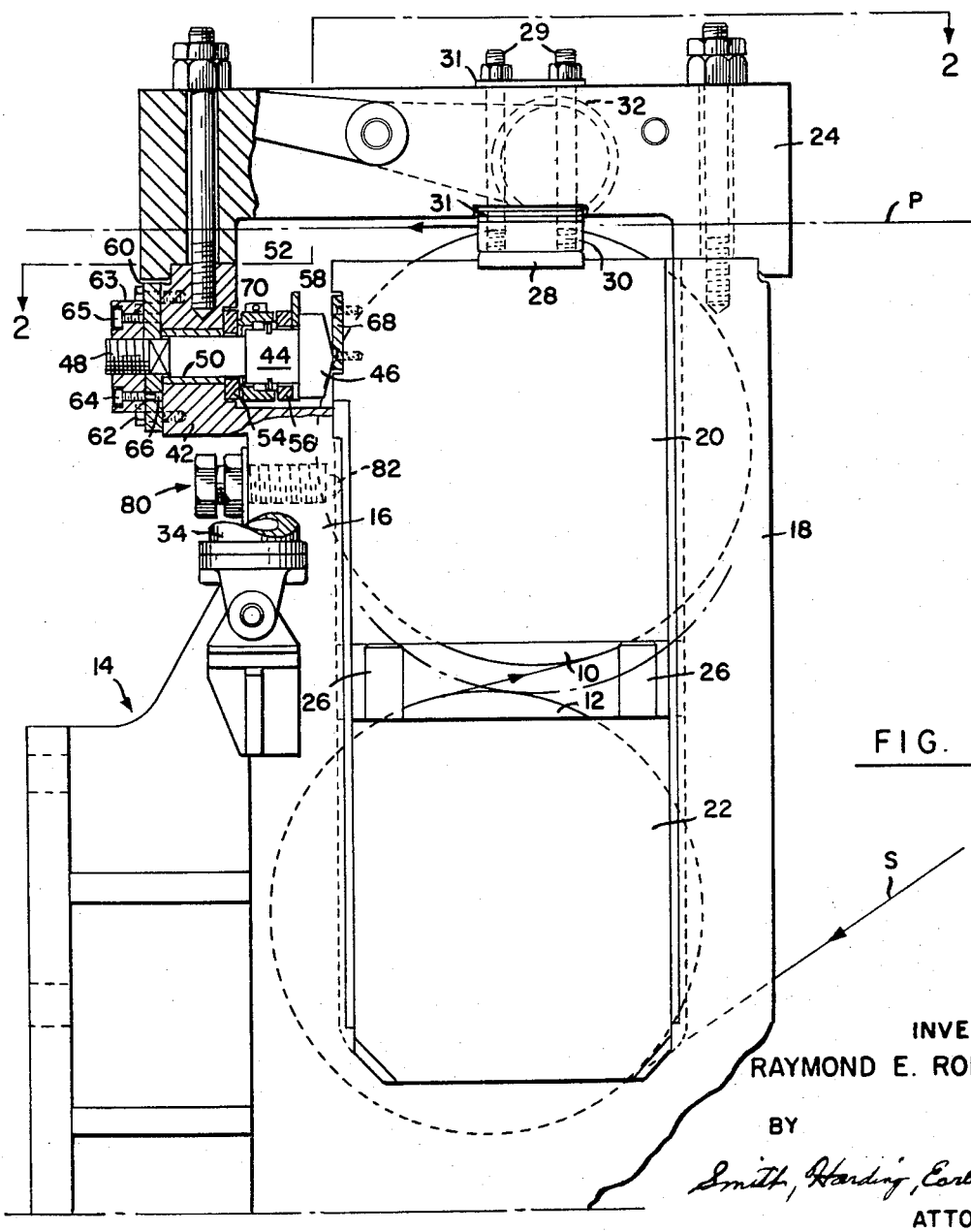
FIG. 1 is an elevation of a bridle roll assembly employing the strip tension sensing device in accordance with the invention.

In FIG. 1, there is provided an S-type bridle roll assembly for use on the entry side of the rolling mill and comprising a pair of rolls 10 and 12 supported on horizontal axes at each end thereof by a supporting framework comprising a main frame 14. The main frame 14 has a pair of vertically extending portions 16 and 18 spaced apart to define a generally rectangular opening adapted to receive the bearing chocks 20 and 22 which rotatably support the ends of the bridle rolls 10 and 12, respectively. The chocks 20 and 22 are provided with vertically extending projecting ribs or tongues which are received in cooperating vertical channels or grooves defined by pairs of liners 17 and 19 and mounted on and forming the inner walls of the vertically extending portions 16 and 18 of the main frame. The chocks are placed into position shown by being slid vertically into the main frame.

A cap member 24 is bolted to the upper ends of the vertically extending members 16 and 18 by means of the bolts 25 as is conventional in the art. The lower chock 22 is supported at its bottom on the main frame. A pair of hydraulic cylinders 26 are provided between the chocks 20 and 22 and are utilized to vertically position the upper chock 20 relative to the lower chock 26 and, of course, thereby serve to position roll 10 relative to roll 12.

During normal operation in which a strip is being fed to the rolling mill, the chocks and rolls are in the position shown in FIG. 1 with the roll 10 spaced above the roll 12 and the strip S being fed in the direction shown by the arrows. The strip is fed from a supply coil (not shown) on the right of the bridle roll assembly around the lower portion of the bottom roll 12 and upwardly between the two rolls 10 and 12 and around the upper portion of the upper roll 10 and then fed off to the left to the rolling mill. The strip is delivered along the pass line P of the mill as is shown in FIG. 1. The hydraulic cylinders 26 maintain the upper chock 20 in the position shown in FIG. 1 with a bearing plate 28 at the top of the upper chock 20 urged in contact against a stop 30 carried by the cap 24 by means of bolts 29. The stop 30 is adjusted by means of shims 31 to properly position the upper roll 10 to maintain the pass line for paying off the strip to the rolling mill. The cooperating surfaces of plate 28 and stop 30 are "TEFLON" coated to minimize the friction therebetween.

As is conventional, a snubber roll 32 is provided. The snubber roll 32 is pivotally mounted on the main frame 14 of the machine by suitable linkage 33 and is urged downwardly into contact with the top of the upper roll 10 as is shown in FIG. 1 by means of an air cylinder 34 pivotally mounted at 36 to the main frame 14. The snubber roll 32 serves to guide the strip as it is payed off along the pass line toward the mill.

When it is desired to thread the forward end of a strip through the bridle roll assembly, the hydraulic cylinders 26 are actuated to lower the upper chock 20 and the upper roll 10 so that the upper roll comes to rest in contact with the lower roll 12. This position is illustrated by the dashed line showing in FIG. 1. This position of the rolls is necessary so that the rolls can frictionally engage the strip during the threading operation. Once the forward end of the strip is in the bite of the mill, the hydraulic cylinders 26 are actuated to maintain the parts in the condition shown in full lines in FIG. 1 with the bearing plate 28 being urged in contact with the stop 30.

It will be apparent that there is provided at each end of the rolls 10 and 12 a supporting frame and associated means such as that described above. Moreover, this type of supporting frame means is one that is conventionally employed in the tension bridle roll assembly described.

In accordance with the invention, means are provided for sensing the tension of the strip S as it is being fed through the bridle roll assembly to the rolling mill. Such means comprises a load cell assembly 40 which is mounted on an upper end portion 42 of the vertical frame portion 16. The frame portion 42 is recessed relative to upper chock 20 as shown in FIG. 1. The load cell assembly includes a pin 44 having a tapered head 46 at one end thereof and a threaded portion 48 at its other end. Pin 44 is mounted on a horizontal axis and is slideably received at a cylindrical medial portion within a bushing 50 mounted in a horizontal bore in frame portion 42.

An annular load cell 52 is mounted on a reduced diameter portion of pin 44 adjacent head 46 between a pair of back-up washers 54 and 56. Washer 54 is received within a recess in and is backed up against frame portion 42. A U-shaped spacer 58 is positioned between washer 56 and head 46. The threaded end of pin 44 extends outwardly from frame portion 42 to the left and through a square hole in an end plate 60 which is fixedly mounted on frame portion 42 by mounting screws 62. The threaded end of pin 44 is engaged with a nut 63 which is held in place against rotation by a lock bolt 64 which is threadedly mounted in one of a plurality of threaded bores 65 in nut 63 with its end extending within one of a plurality of circumferentially spaced holes 66 in end plate 60. This arrangement is utilized during installation of the load cell assembly to secure the nut 63 in a desired position for accurately setting the load cell assembly as will be described hereafter.

A bumper block 68 is mounted on the vertically extending side wall of chock 20 in alignment with the axis of the load cell assembly. Accordingly, the tapered end of the pin 44 may be positioned to bear against the bumper block 68.

There will be provided a load cell assembly 40 associated with each of the bearing chocks 20 supporting each end of the roll 10.

End load cell 52 is of the pressure-sensitive type whereby as a load is applied thereto tending to compress the same, it will produce a voltage output which corresponds to the magnitude of the applied load. This voltage output is delivered through the leads 70 which extend from the top of the load cell 52 to a suitable junction box (not shown).

The load cell 52 is entirely conventional and its signal may be utilized to operate an indicating device or a control device in accordance with the particular application desired. Load cells and circuitry of the indicated type are well known in the art.

It will be noted that the chock 20 for the upper roll 10 is held securely against any vertical movement by means of the hydraulic cylinders 26 at the bottom thereof and the stop 30 at the top thereof. In accordance with the invention, the chock 20 is mounted so that it may have a small amount of movement in the direction toward the load cell assembly. This is achieved by reason of the arrangement whereby there is provided a small clearance between the opposed faces of support members 16 and 18 and the cooperating vertical sides of the chock 20. By way of example, in a typical installation this clearance would range between 0.006 and 0.010 inch. Thus, it will be apparent that this clearance is quite small.

In order to utilize this clearance in the sensing means in accordance with the invention, means are provided for moving the chock laterally away from the load cell assembly 40. To this end there is provided a screw jack 80 which is threadedly received in a horizontal bore in frame portion 16. The screw jack 80 is movable horizontally toward and away from the vertical side wall of the chock 20 and is adapted to contact the same at an end portion 82 as is best shown in FIG. 1. There is, of course, a screw jack provided at each end of the roll 10. In the installation of a load cell assembly 40, each of the screw jacks 80 is operated to jack the chocks 20 at each end of the roll 10 toward the entry side of the main frame, i.e., toward vertical member 18. This is done to take up all of the clearance between members 16 and 18 to the delivery side of the chocks.

The load cell assembly 40 is then installed with the chock 20 positioned with the entire clearance adjacent the frame member 16 as was described above. This installation procedure involves loosening the nut 63 and inserting a properly sized spacer 58 between washer 56 and the head 46 of pin 44 and then tightening the nut 63 until a desired clearance is provided between the head 46 of the pin 44 and the bumper block 68. Typically, this clearance should be about 0.001 inch. The nut 63 is tightened when this clearance is achieved and a lock bolt 64 is put in place to hold the nut 63 once the proper clearance is set. The clearance may be adjusted and is chosen to take into account the overall possible movement of the chock 20 and the maximum deflection of the load cell 52 for the maximum load involved. The parts will be set so that the load cell 52 can be actuated through its maximum deflection. Moreover, the washers 54 and 56 which back-up the load applied to the load cell assembly 40 are of hardened steel so as to withstand the loads involved.

At this point in the installation procedure the load cell meters are zeroed and the jack screws 80 are relieved.

It will be apparent that as a strip is fed through the bridle roll assembly, the tension thereon causes the strip passing around roll 10 to pull it and each chock 20 supporting it horizontally toward the left and force its bumper block 68 against the tapered head 46 of each load cell assembly 40. The vertical support for each chock 20 provided by cylinders 26 and stop 30 guides each chock in such movement. Accordingly, each chock 20 applies a load through the associated pin 44 to compress a load cell 52 backed by a frame portion 42. Any movement produced by this load is accommodated by the slidable support of pin 44 in bushing 50.

By this arrangement the load cells 52 will in effect be sensing the tension forces on the strip. Moreover, by proper calibration, the load cells 52 may provide a direct reading of the tension of the strip, it being noted that the chock is urged along an axis parallel to the axis of the load cell assembly 40.

It will be apparent that various changes may be made in the construction and arrangement of parts without departing from the scope of the invention. For example, the tension sensing means in accordance with the invention may be incorporated in either the entry or the delivery bridle roll assembly and may be applied to other suitable rolls associated with the mill.

I claim:

1. In a bridle-type roll assembly associated with a rolling mill or the like and through which a strip of material is passed under tension as it is fed to or from the rolling mill, chock means for rotatably supporting a roll about which the strip passes as it moves through the bridle roll assembly, and means for sensing the tension of said strip including a load cell, means for supporting said sensing means adjacent said chock means at a location whereby the tension on said strip passing about said roll causes said chock means to bear against said sensing means, and means for transmitting said bearing forces of said chock means caused by said strip tension to said load cell.

2. In a roll assembly according to claim 1, means for supporting said chock means adjacent said sensing means including frame means having a small amount of clearance permitting movement of said chock means in the direction of said sensing means.

3. In a roll assembly according to claim 2, means for moving said chock means in said support means in the direction away from said sensing means.

4. In a roll assembly according to claim 3, means for adjusting said sensing means in the direction of said clearance for said chock means.

5. In a roll assembly according to claim 2, a second roll beneath said first roll and about which said strip passes as it moves through the bridle roll assembly, and chock means for rotatably supporting said second roll, said second roll chock means being supported in said frame means beneath said first roll chock means, said strip passing through said bridle roll assembly in an S-like path around said rolls.

6. In a roll assembly according to claim 5, means between said first roll chock means and second roll chock means for positioning the rolls vertically relative to one another, and stop means above said first roll chock means for limiting the upward movement thereof.

7. In a roll assembly according to claim 6 wherein said strip is fed from the top of said upper roll along the pass line of the mill and said sensing means is mounted on an axis parallel to the pass line of the mill.

8. In a roll assembly according to claim 7, means for moving said first roll chock means in said frame means in the direction away from said sensing means.

9. In a roll assembly according to claim 8, means for adjusting said sensing means in the direction of said clearance for said first roll chock means.

10. In a roll assembly according to claim 4 wherein said sensing means includes a pin slideably mounted in the frame means, nut means, one end of said pin being threaded and cooperating with said nut means for axial adjustment of said pin, the other end of said pin being mounted to contact the chock means, said load cell being located between said other end of said pin and said frame means so that the load applied to said pin by said chock means tends to compress said load cell between said pin and said frame means.

* * * * *